US009205775B2

(12) United States Patent
Harkins

(10) Patent No.: US 9,205,775 B2
(45) Date of Patent: Dec. 8, 2015

(54) PRISM FOR LIGHT REFLECTING/DIFFUSION BETWEEN LED'S

(71) Applicants: DENSO International America, Inc., Southfield, MI (US); DENSO CORPORATION, Kariya-shi, Aichi-ken (JP)

(72) Inventor: Ian Harkins, Flat Rock, MI (US)

(73) Assignees: DENSO International America, Inc., Southfield, MI (US); DENSO CORPORATION, Kariya, Aichi-pref. (JP)

(*) Notice: Subject to any disclaimer, the term of this patent is extended or adjusted under 35 U.S.C. 154(b) by 184 days.

(21) Appl. No.: 14/042,816

(22) Filed: Oct. 1, 2013

(65) Prior Publication Data

US 2015/0092389 A1   Apr. 2, 2015

(51) Int. Cl.
*G01D 11/28* (2006.01)
*B60Q 3/04* (2006.01)

(52) U.S. Cl.
CPC ..................... *B60Q 3/044* (2013.01)

(58) Field of Classification Search
CPC .............................. B60Q 3/04; B60Q 3/0293
USPC ................... 362/23.1, 23.07, 23.17
See application file for complete search history.

(56) References Cited

U.S. PATENT DOCUMENTS

| 6,979,094 | B1* | 12/2005 | Venkatram ................ 362/23.13 |
| 7,482,915 | B2 | 1/2009 | Sumiya et al. |
| 2005/0162090 | A1 | 7/2005 | Birman et al. |
| 2009/0323311 | A1* | 12/2009 | Mezouari ................ 362/97.1 |

FOREIGN PATENT DOCUMENTS

| EP | 1133659 A1 | 9/2001 |
| JP | H09287980 A | 11/1997 |
| JP | H10142012 A | 5/1998 |
| JP | H10332439 A | 12/1998 |
| JP | 2000011728 A | 1/2000 |
| JP | 2000211234 A | 8/2000 |
| JP | 2001099685 A | 4/2001 |
| JP | 2001108489 A | 4/2001 |
| JP | 2001215137 A | 8/2001 |
| JP | 2001281007 A | 10/2001 |
| JP | 2002144956 A | 5/2002 |
| JP | 3301077 B2 | 7/2002 |
| JP | 2002195856 A | 7/2002 |
| JP | 2002225593 A | 8/2002 |
| JP | 2002257601 A | 9/2002 |
| JP | 2002296078 A | 10/2002 |
| JP | 2002296079 A | 10/2002 |
| JP | 3401786 B2 | 4/2003 |
| JP | 2003106876 A | 4/2003 |
| JP | 2003139582 A | 5/2003 |
| JP | 3430069 B2 | 7/2003 |
| JP | 3494373 B2 | 2/2004 |
| JP | 2004061326 A | 2/2004 |

(Continued)

*Primary Examiner* — Ali Alavi
(74) *Attorney, Agent, or Firm* — Harness, Dickey & Pierce, P.L.C.

(57) ABSTRACT

A first light-emitting element and a second light-emitting element spaced apart from the first light-emitting element. An optical element is opposite to and between the first and the second light-emitting elements. The optical element is configured to at least one of reflect or diffuse light emitted by the first and the second light-emitting elements.

19 Claims, 3 Drawing Sheets

(56) References Cited

FOREIGN PATENT DOCUMENTS

| | | |
|---|---|---|
| JP | 3501202 B2 | 3/2004 |
| JP | 3503596 B2 | 3/2004 |
| JP | 3526036 B2 | 5/2004 |
| JP | 2004231020 A | 8/2004 |
| JP | 2004301663 A | 10/2004 |
| JP | 3599184 B2 | 12/2004 |
| JP | 3613426 B2 | 1/2005 |
| JP | 2005227258 A | 8/2005 |
| JP | 2005241484 A | 9/2005 |
| JP | 2005241529 A | 9/2005 |
| JP | 3714640 B2 | 11/2005 |
| JP | 2005331455 A | 12/2005 |
| JP | 2005337775 A | 12/2005 |
| JP | 2006007854 A | 1/2006 |
| JP | 3747452 B2 | 2/2006 |
| JP | 3747461 B2 | 2/2006 |
| JP | 3747466 B2 | 2/2006 |
| JP | 2006047128 A | 2/2006 |
| JP | 2006047271 A | 2/2006 |
| JP | 2006078778 A | 3/2006 |
| JP | 2006098161 A | 4/2006 |
| JP | 2006126048 A | 5/2006 |
| JP | 2006162383 A | 6/2006 |
| JP | 2006317154 A | 11/2006 |
| JP | 2007017166 A | 1/2007 |
| JP | 2007033346 A | 2/2007 |
| JP | 3893879 B2 | 3/2007 |
| JP | 2007069886 A | 3/2007 |
| JP | 2007113602 A | 5/2007 |
| JP | 2007121486 A | 5/2007 |
| JP | 2007123749 A | 5/2007 |
| JP | 3928841 B2 | 6/2007 |
| JP | 2007147296 A | 6/2007 |
| JP | 2007156060 A | 6/2007 |
| JP | 2007170899 A | 7/2007 |
| JP | 2007232473 A | 9/2007 |
| JP | 2008010286 A | 1/2008 |
| JP | 4169296 B2 | 10/2008 |
| JP | 4287627 B2 | 7/2009 |
| JP | 4302764 B2 | 7/2009 |
| JP | 4316619 B2 | 8/2009 |
| JP | 4346648 B2 | 10/2009 |
| JP | 4366857 B2 | 11/2009 |
| JP | 4427751 B2 | 3/2010 |
| JP | 4468637 B2 | 5/2010 |
| JP | 4499492 B2 | 7/2010 |
| JP | 4510019 B2 | 7/2010 |
| JP | 4512023 B2 | 7/2010 |
| JP | 4514569 B2 | 7/2010 |
| JP | 4534095 B2 | 9/2010 |
| JP | 4542818 B2 | 9/2010 |
| JP | 4577657 B2 | 11/2010 |
| JP | 4592331 B2 | 12/2010 |
| JP | 4597605 B2 | 12/2010 |
| JP | 4610937 B2 | 1/2011 |
| JP | 4626843 B2 | 2/2011 |
| JP | 4641244 B2 | 3/2011 |
| JP | 4660206 B2 | 3/2011 |
| JP | 4671099 B2 | 4/2011 |
| JP | 4690128 B2 | 6/2011 |
| JP | 4697771 B2 | 6/2011 |
| JP | 4704716 B2 | 6/2011 |
| JP | 4712145 B2 | 6/2011 |
| JP | 4746970 B2 | 8/2011 |
| JP | 4796833 B2 | 10/2011 |
| JP | 4797696 B2 | 10/2011 |
| JP | 4801979 B2 | 10/2011 |
| JP | 4826161 B2 | 11/2011 |
| JP | 4834327 B2 | 12/2011 |
| WO | WO-0123804 A1 | 4/2001 |
| WO | WO-2005/080139 A1 | 9/2005 |
| WO | WO-2005080135 A1 | 9/2005 |

\* cited by examiner

PRISM FOR LIGHT REFLECTING/DIFFUSION BETWEEN LED'S

FIELD

The present disclosure relates to a prism for reflecting and/or diffusing light emitted by a light-emitting element of, for example, an instrument cluster assembly.

BACKGROUND

This section provides background information related to the present disclosure, which is not necessarily prior art.

Instrument cluster assemblies, such as for motor vehicles, often include light-emitting elements to illuminate various dials and gauges included therewith. While such light-emitting elements are suitable for their intended use, they are subject to improvement. For example, an instrument cluster assembly including multiple light-emitting elements configured to provide improved illumination of dials and gauges with a reduced number of light reflectors and/or diffusers, which have increased effectiveness, would be desirable.

SUMMARY

This section provides a general summary of the disclosure, and is not a comprehensive disclosure of its full scope or all of its features.

The present teachings provide for a first light-emitting element and a second light-emitting element spaced apart from the first light-emitting element. An optical element is opposite to and between the first and the second light-emitting elements. The optical element is configured to at least one of reflect or diffuse light emitted by the first and the second light-emitting elements.

The present teachings also provide for an instrument cluster assembly including a circuit board and an optical layer. The circuit board includes a first light-emitting element and a second light-emitting element mounted thereto. The optical layer includes an optical element extending towards the circuit board. A distal-most portion of the optical element is closest to the circuit board and is opposite to a portion of the circuit board between the first and the second light-emitting elements. The optical element is configured to at least one of reflect or diffuse light.

The present teachings further provide for a circuit board and an optical layer. The circuit board includes a first light-emitting element and a second light-emitting element mounted thereto. The optical layer includes an elongated optical element extending in a first direction along a longitudinal axis and extending in a second direction generally perpendicular to the first direction to a distal-most portion of the elongated optical element that is opposite to an area of the circuit board between the first and the second light-emitting elements. The optical element is configured to at least one of reflect or diffuse light emitted by the first and the second light-emitting elements.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
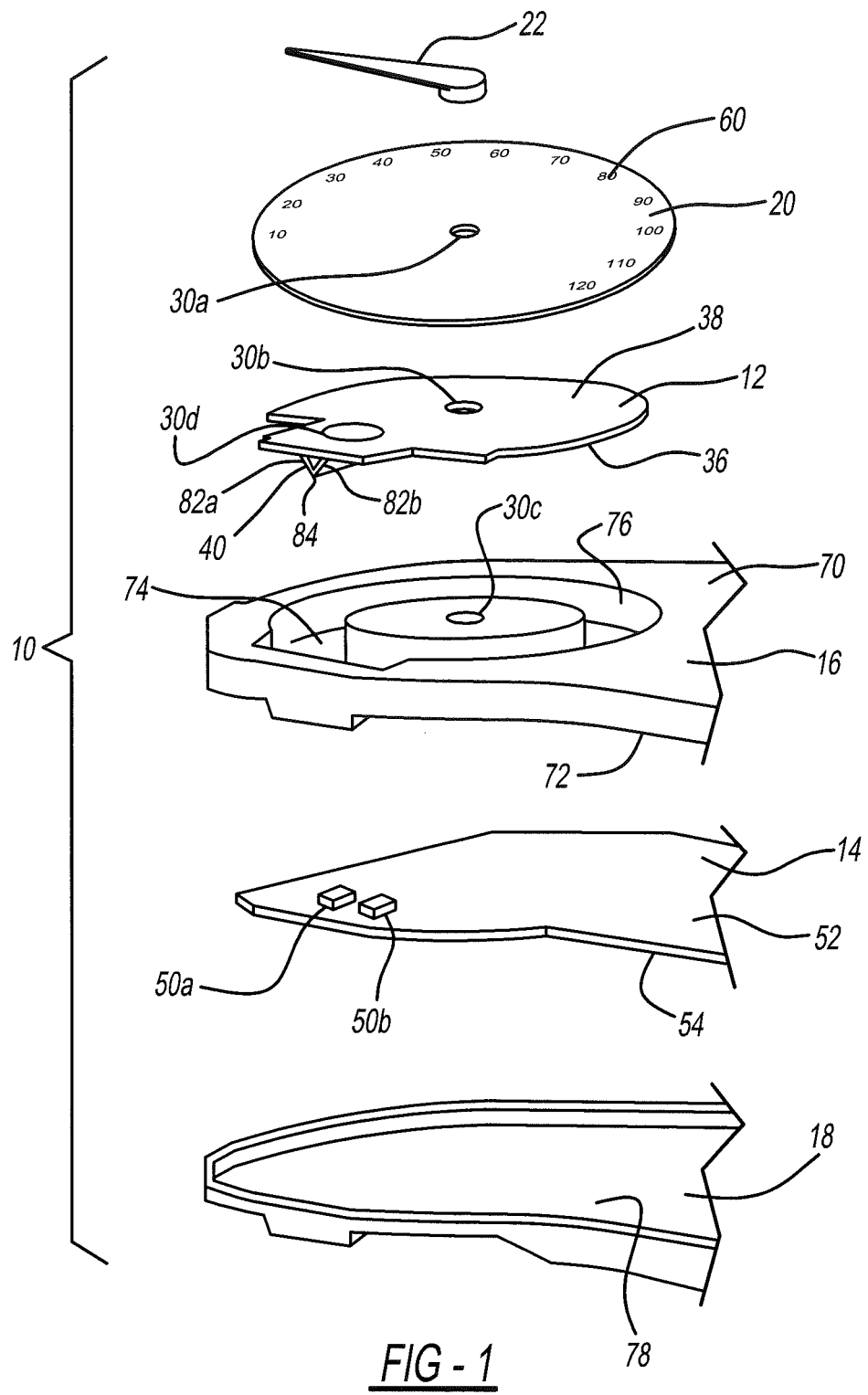
FIG. 1 is an exploded view of an instrument cluster assembly according to the present teachings.

With initial reference to FIG. 1, an instrument cluster assembly according to the present teachings is generally illustrated at reference numeral 10. The instrument cluster assembly 10 generally includes an optical layer or disc 12, a circuit board 14, a reflective case including a reflective case body 16 and a reflective case base 18, a dial or applique 20, and a pointer 22. The pointer 22 is mounted to a rotating member (not shown) such as a post extending through an applique aperture 30a defined at a center of applique 20, a first optical layer aperture 30b defined by the optical layer 12, and a case body aperture 30c defined by the reflective case body 16. The rotating member can be rotated in any suitable manner by any suitable device, such as a stepper motor. The optical layer 12 defines a second aperture 30d offset from the first aperture 30b, which may accommodate additional posts for rotating additional pointers.

The optical layer 12 includes a first side 36 and a second side 38 opposite thereto. Extending from the first side 36 is an optical element 40. The optical element 40 can be any suitable element, device, or structure, for example, configured to reflect and/or diffuse light, such as a prism for example. The optical element 40 will be described in further detail herein with reference to FIGS. 2A, 2B, 3A, and 3B.

The circuit board 14 includes a first light-emitting element 50a and a second light-emitting element 50b. The first and second light-emitting elements 50a and 50b are at an outer surface 52 of the circuit board 14, which is opposite to an inner surface 54. The first and second light-emitting elements 50a and 50b can each be any suitable light source, such as a semiconductor light source including light-emitting diodes (LEDs). The first and second light-emitting elements 50a and 50b can be configured to emit light having the same color or different colors. The first and second light-emitting elements 50a and 50b can also be configured to emit light having the same or similar intensities, or different intensities. Furthermore, the first and second light-emitting elements 50a and 50b can each be configured to emit light having only one color, or multiple colors.

The first and second light-emitting elements 50a and 50b are configured and arranged to illuminate graphics 60 of the applique 20. The applique 20 and/or the graphics 60 are thus configured and arranged such that they are at least partially transparent to light emitted from the first and second light-emitting elements 50a and 50b. The graphics 60 can be configured to convey a variety of information, such as speed of a vehicle that the instrument cluster assembly 10 is associated with. The pointer 22 can be configured to designate, for example, the appropriate graphic 60 representing the current speed of the vehicle.

The reflective case body 16 includes an outer surface 70 and an inner surface 72, which is opposite to the outer surface 70. The reflective case body 16 defines a recess 74 beneath the outer surface 70. The recess 74 includes reflective sidewalls 76, which are configured to direct light emitted from the first and second light-emitting elements 50a and 50b to the applique 20.

The reflective case body 16 is generally between the optical layer 12 and the circuit board 14. The optical layer 12 is arranged such that the first side 36 thereof is at or proximate to the outer surface 70 of the reflective case body 16, and the optical element 40 of the optical layer 12 extends into the recess 74. The circuit board 14 is arranged such that the first and second light-emitting elements 50a and 50b extend through, or are aligned with, one or more openings defined in the inner surface 72 of the reflective case body 16.

The first and second light-emitting elements 50a and 50b are spaced apart from one another and the optical element 40 is arranged generally opposite to a portion of the outer surface 52 of the circuit board 14 between the first and second light-emitting elements 50a and 50b. The reflective case body 16, the optical layer 12, and the circuit board 14 are seated within a receptacle 78 of the reflective case base 18, with the circuit board 14 seated deepest or furthest within the receptacle 78. The reflective case body 16 is between the circuit board 14 and the optical layer 12. The applique 20 is seated on the second side 38 of the optical layer 12.

Additional features of the optical element 40 will now be described, such as with reference to FIGS. 2A, 2B, 3A, and 3B. The optical element 40 includes a light deflecting and/or diffusing portion 80, including a first portion 82a and a second portion 82b. The light deflecting and/or diffusing portion 80 extends to a distal portion 84 thereof from an inner surface 86 of the optical layer 12, which is at the first side 36 of the optical layer 12. The first portion 82a is on a first side of the distal portion 84 and the second portion 82b is on a second side of the distal portion 84 opposite to the first portion 82a.

Figure 2A:
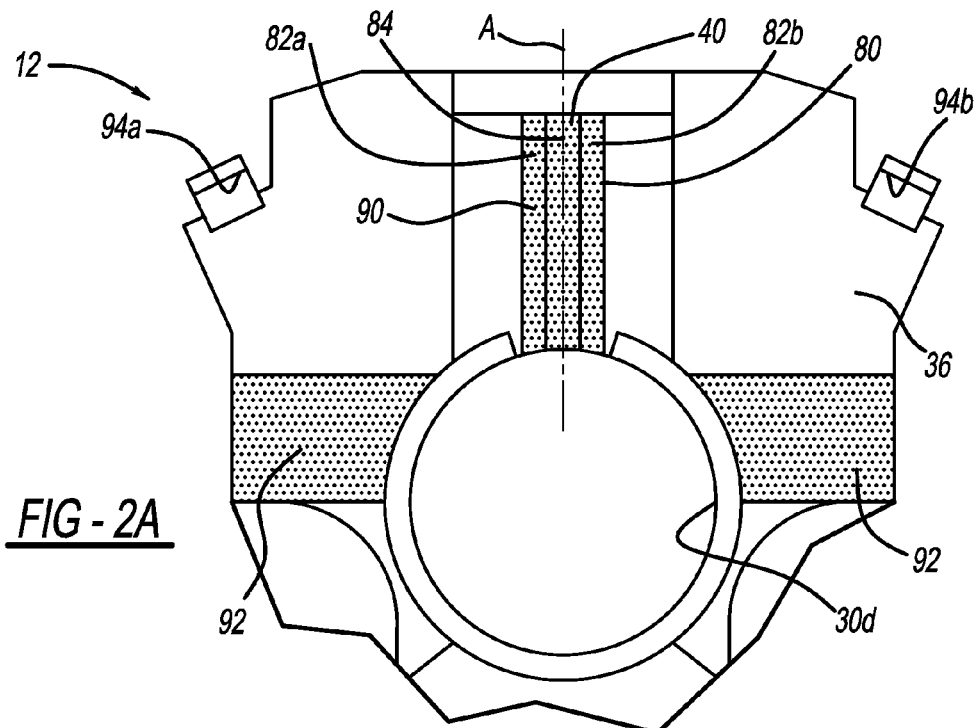
FIG. 2A is a planar view of an optical layer of the instrument cluster assembly including an optical element according to the present teachings.
Figure 2B:
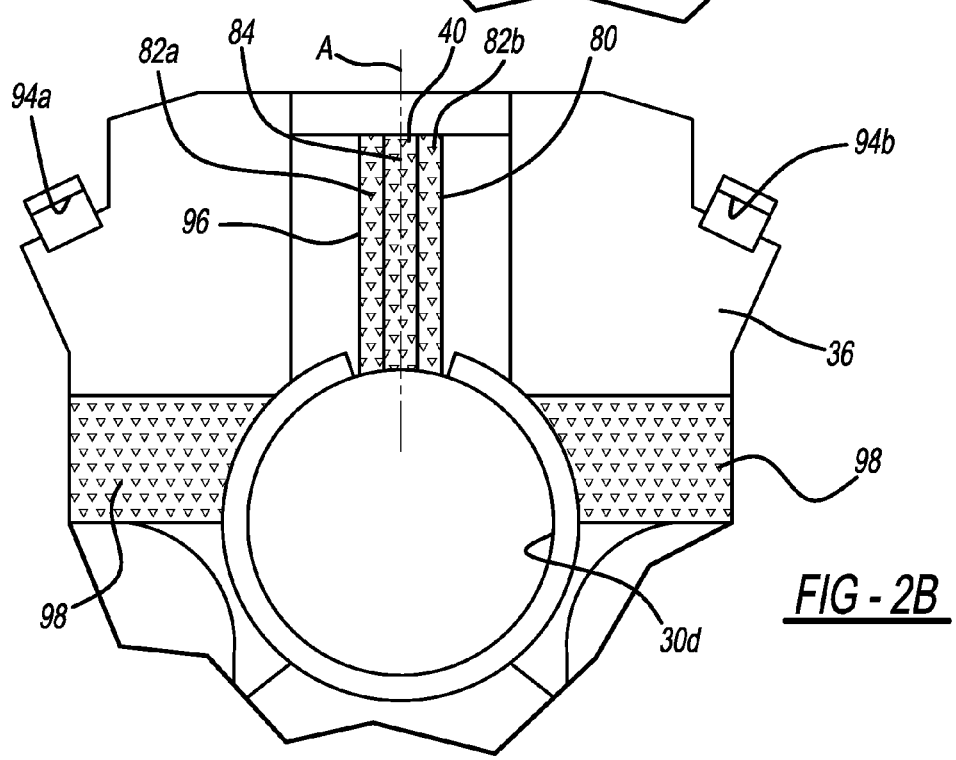
FIG. 2B is a planar view of the optical layer including another optical element according to the present teachings.

As illustrated in FIGS. 2A and 2B, the optical element 40 is elongated and extends along an axis A of the optical layer 12. The optical element 40 defines a hollow cavity 88 (FIGS. 3A and 3B) between the optical element 40 and generally the first side 36 of the optical layer 12. The light deflecting and/or diffusing portion 80 can be any suitable arrangement, structure, device, or surface, for example, configured to deflect and/or diffuse light emitted from the first and second light-emitting elements 50a and 50b. For example, the light deflecting and/or diffusing portion 80 can include a textured portion or surface 90, as illustrated in FIG. 2A, configured to facilitate and/or enhance deflection and/or diffusion of light emitted by the first and the second light-emitting elements 50a and 50b. The textured portion 90 can be textured in any suitable manner, such as with a roughened surface. In place of or in addition to the textured portion 90, the light deflecting and/or diffusing portion 80 can include a patterned surface 96, as illustrated in FIG. 2B. The patterned surface 96 can include any suitable shapes and/or patterns, such as a plurality of dimples, raised or recessed dots, semicircular patterns, etc. As illustrated in FIG. 2A, textured portion or surface 92 can also be provided on portions of the first side 36 of the optical layer 12 other than at the optical element 40, such as on opposite sides of the second aperture 30d. Similarly, and with reference to FIG. 2B, patterned portion or surface 98 can be provided at any suitable portion of the first side 36 of the optical layer 12 other than the optical element 40, such as on opposite sides of the second aperture 30d.

Figure 3A:
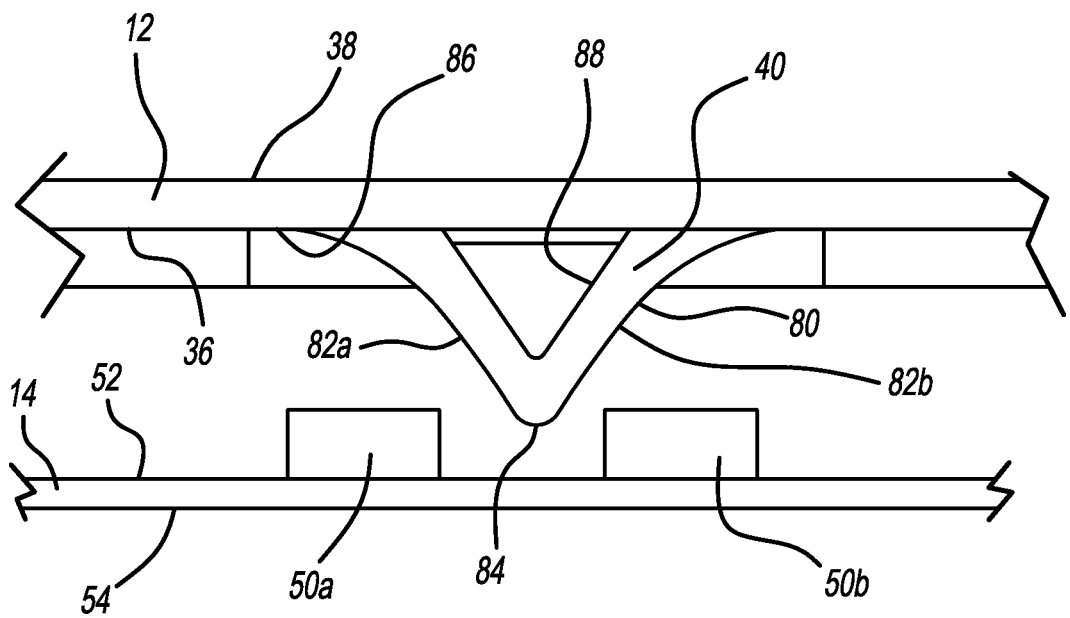
FIG. 3A is a side view of the optical element according to the present teachings, and a circuit board with first and second light-emitting elements opposite to the optical element.
Figure 3B:
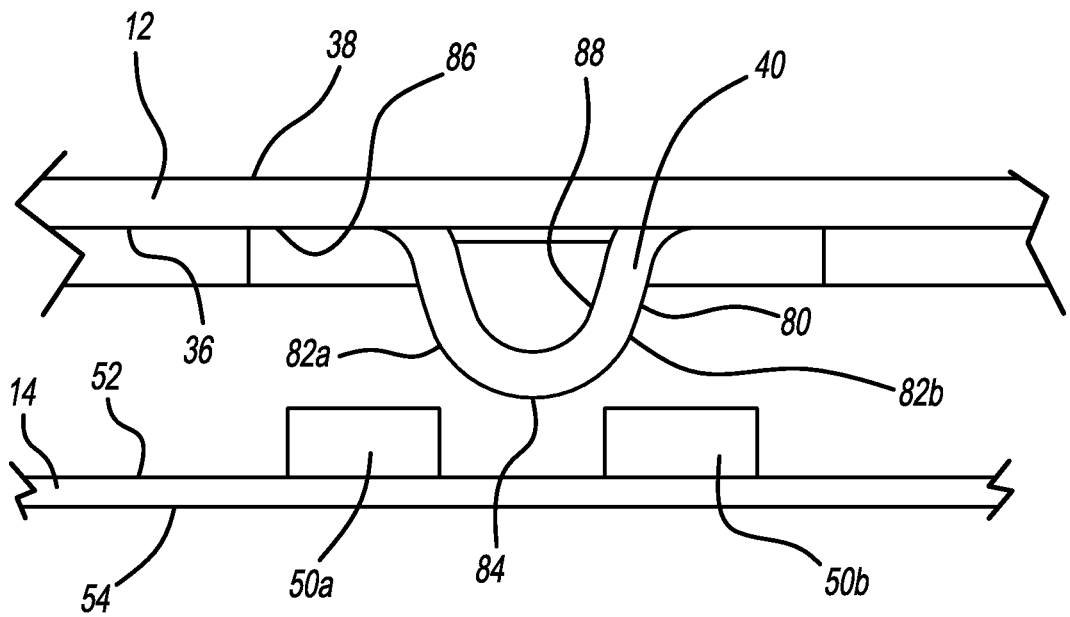
FIG. 3B is a side view of another optical element according to the present teachings, and the circuit board with first and second light-emitting elements opposite to the optical element.

The optical element 40 is arranged such that the distal portion 84, which generally extends along the longitudinal axis A, is equidistant, or about equidistant, between the first light-emitting element 50a and the second light-emitting element 50b. The optical element 40 is configured to direct light emitted by the first and second light-emitting elements 50a and 50b to the applique 20 in order to illuminate the graphics 60. The optical element 40 can have a generally V-shape in cross-section or when viewed at an end thereof, as illustrated in FIG. 3A, or a generally U-shape in cross-section or when viewed at an end thereof, as illustrated in FIG. 3B.

Arrangement of the optical element 40 between the first and the second light-emitting elements 50a and 50b allows a single optical element 40 to be used to direct light emitted by the first light-emitting element 50a and/or the second light-emitting element 50b to the applique 20. In addition to the V-shape and the U-shape of the optical element 40 illustrated in FIGS. 3A and 3B respectively, the optical element 40 can have any other suitable cross-sectional shape. For example, if three light-emitting elements are included, the optical element 40 can have a generally W-shape in cross-section or when viewed at an end thereof such that portions of the optical element 40 are between each one of the three light-emitting elements.

The first and second light-emitting elements 50a and 50b can be operated in any suitable manner. For example, if the first light-emitting element 50a is configured to emit light at a first intensity (relatively low intensity), then the first light-emitting element can be operated during conditions when relatively little light is needed to illuminate the applique 20 and graphics 60. If the second light-emitting element 50b is configured to operate at a second intensity greater than the first intensity, then the second light-emitting element 50b can be configured to illuminate during conditions when relatively more light is needed to illuminate the applique 20 and graphics 60. Regardless of which one of the first and second light-emitting elements 50a and 50b is illuminated, the optical element 40 will direct light to the applique 20 because the optical element 40 is between the first and second light-emitting elements 50a and 50b. Use of separate optical elements for each light-emitting element 50a and 50b is thus not necessary, which reduces cost and simplifies manufacturing and assembly of the instrument cluster assembly 10. The first and the second light-emitting elements 50a and 50b can be configured such they are not illuminated simultaneously, or can be configured to illuminate simultaneously in some applications.

As illustrated in FIGS. 2A and 2B, the optical layer 12 can further include a first side reflecting member 94a and a second side reflecting member 94b. The first and second side reflecting members 94a and 94b can be configured to further direct light emitted by the first and second light-emitting elements 50a and 50b to the applique 20 in order to further increase illumination of the applique 20 and/or the graphics 60 thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An instrument cluster assembly comprising:
   a first light-emitting element and a second light-emitting element spaced apart from the first light-emitting element; and
   an optical element opposite to and between the first and the second light-emitting elements, the optical element is configured to at least one of reflect or diffuse light emitted by the first and the second light-emitting elements; wherein
   the optical element defines a hollow cavity.

2. The instrument cluster assembly of claim 1, wherein the first and the second light-emitting elements are mounted to a circuit board.

3. The instrument cluster assembly of claim 1, wherein the first and the second light-emitting elements are light-emitting diodes.

4. The instrument cluster assembly of claim 1, wherein the first and the second light-emitting elements are different colors.

5. The instrument cluster assembly of claim 1, wherein the first and the second light-emitting elements have different light-emitting intensities.

6. The instrument cluster assembly of claim 1, wherein at least one of the first and the second light-emitting elements are configured to emit light having more than one color.

7. The instrument cluster assembly of claim 1, wherein the optical element is included with an optical layer of the instrument cluster assembly between an applique layer and a circuit board including the first and the second light-emitting elements.

8. The instrument cluster assembly of claim 1, wherein the optical element is a prism.

9. The instrument cluster assembly of claim 1, wherein the optical element includes a light deflecting/diffusion surface that is generally round or generally V-shaped.

10. The instrument cluster assembly of claim 1, wherein the optical element includes a light deflecting and/or diffusing surface, at least a portion of which faces the first and the second light-emitting elements.

11. The instrument cluster assembly of claim 1, wherein the optical element extends to a distal portion thereof that is between the first and the second light-emitting elements.

12. The instrument cluster assembly of claim 1, wherein the optical element includes a light deflecting/diffusion surface having at least one of a textured surface or a patterned surface.

13. An instrument cluster assembly comprising:
    a circuit board including a first light-emitting element and a second light-emitting element mounted thereto; and
    an optical layer including an optical element extending towards the circuit board, a distal-most portion of the optical element is closest to the circuit board and is opposite to a portion of the circuit board between the first and the second light-emitting elements, the optical element is configured to at least one of reflect or diffuse light.

14. The instrument cluster assembly of claim 13, wherein the optical element includes a surface that is at least one of textured or patterned.

15. The instrument cluster assembly of claim 13, wherein the optical element is elongated and extends along an axis.

16. The instrument cluster assembly of claim 13, wherein the optical element is one of U-shaped or V-shaped.

17. An instrument cluster assembly comprising:
    a circuit board including a first light-emitting element and a second light-emitting element mounted thereto; and
    an optical layer including an elongated optical element extending in a first direction along a longitudinal axis and extending in a second direction generally perpendicular to the first direction to a distal-most portion of the elongated optical element that is opposite to an area of the circuit board between the first and the second light-emitting elements, the optical element is configured to at least one of reflect or diffuse light emitted by the first and the second light-emitting elements.

18. The instrument cluster of claim 17, wherein the optical element is one of U-shaped or V-shaped; and
    wherein the optical element includes a surface that is at least one of textured or patterned.

19. The instrument cluster of claim 17, further comprising a reflective case between the optical layer and the circuit board, the optical element extends into the reflective case;
    wherein the longitudinal axis extends generally parallel to a plane in which the optical layer extends.

* * * * *